(12) United States Patent
Mayuzumi et al.

(10) Patent No.: US 10,793,213 B2
(45) Date of Patent: Oct. 6, 2020

(54) SADDLE TYPE VEHICLE

(71) Applicant: HONDA MOTOR CO., LTD., Minato-ku, Tokyo (JP)

(72) Inventors: Kei Mayuzumi, Wako (JP); Kazuyuki Tachibana, Wako (JP); Junpei Yasuda, Wako (JP); Shota Yamasaki, Wako (JP); Kei Fukuyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/132,646

(22) Filed: Sep. 17, 2018

(65) Prior Publication Data
US 2019/0084635 A1 Mar. 21, 2019

(30) Foreign Application Priority Data

Sep. 19, 2017 (JP) ................. 2017-178813

(51) Int. Cl.
| | |
|---|---|
| *B25J 1/00* | (2006.01) |
| *B62J 1/08* | (2006.01) |
| *B62J 1/12* | (2006.01) |
| *B62K 11/04* | (2006.01) |
| *B62K 19/46* | (2006.01) |
| *B62K 19/30* | (2006.01) |

(Continued)

(52) U.S. Cl.
CPC . *B62J 1/08* (2013.01); *B62J 1/12* (2013.01); *B62J 1/14* (2013.01); *B62K 11/04* (2013.01); *B62K 19/30* (2013.01); *B62K 19/36* (2013.01); *B62K 19/46* (2013.01); *B62K 19/24* (2013.01)

(58) Field of Classification Search
CPC ....... B62J 1/08; B62J 1/12; B62J 1/28; B62K 19/46; B62K 11/04

USPC ................. 248/424, 429; 297/195.1, 195.12; 180/218, 219
See application file for complete search history.

(56) References Cited

U.S. PATENT DOCUMENTS

| | | | |
|---|---|---|---|
| 7,837,260 B2 * | 11/2010 | Hein .................. | B62J 1/12 297/195.12 |
| 2014/0062058 A1 * | 3/2014 | Tsutsui ................ | B62J 6/18 280/281.1 |

(Continued)

FOREIGN PATENT DOCUMENTS

| | | |
|---|---|---|
| GB | 2392893 | 3/2004 |
| JP | 62-155186 | 7/1987 |

(Continued)

OTHER PUBLICATIONS

Extended European Search Report for European Patent Application No. 18194475.2 dated Feb. 5, 2019.

(Continued)

*Primary Examiner* — Steven M Marsh
(74) *Attorney, Agent, or Firm* — Amin, Turocy & Watson, LLP (57) ABSTRACT

A saddle type vehicle includes a seat rail and a seat that is attached to the seat rail. The seat rail includes an outer edge that is placed on an outward side in a vehicle body width direction and an inner edge that is placed on an inward side in the vehicle body width direction and higher than the outer edge. On the other hand, the seat includes a sitting part. When the sitting part sits on an upper surface of the inner edge, a side part of the seat surrounds (covers) the sitting part.

8 Claims, 10 Drawing Sheets

(51) Int. Cl.
  *B62J 1/14*    (2006.01)
  *B62K 19/36*   (2006.01)
  *B62K 19/24*   (2006.01)

(56) References Cited

U.S. PATENT DOCUMENTS

| | | | |
|---|---|---|---|
| 2015/0197298 A1* | 7/2015 | Sasaki | B62J 1/12 297/215.14 |
| 2016/0101819 A1* | 4/2016 | Iwata | B62J 1/14 280/202 |
| 2017/0282987 A1* | 10/2017 | Koishikawa | B62J 1/08 |
| 2019/0248437 A1* | 8/2019 | Matsushima | B60K 15/03 |

FOREIGN PATENT DOCUMENTS

| | | |
|---|---|---|
| JP | 2001-071973 | 3/2001 |
| JP | 2002-284064 | 10/2002 |
| JP | 2006-069438 | 3/2006 |
| JP | 2015-227131 | 12/2015 |

OTHER PUBLICATIONS

Japanese Office Action for Japanese Patent Application No. 2017-178813 dated Mar. 5, 2019.

* cited by examiner

● :SITTING POSITION OF RING CONTACT PART 152
■ :SITTING POSITION OF CONTACT PART 172

SADDLE TYPE VEHICLE

CROSS-REFERENCE TO RELATED APPLICATION

This application is based upon and claims the benefit of priority from Japanese Patent Application No. 2017-178813 filed on Sep. 19, 2017, the contents of which are incorporated herein by reference.

BACKGROUND OF THE INVENTION

Field of the Invention

The present invention relates to a saddle type vehicle, and more particularly to a saddle type vehicle including a seat attachment structure that is suitable, for example, to a motorcycle in which a cowl is not provided below a seat.

Description of the Related Art

A saddle type vehicle such as a motorcycle is provided with a seat on which a user is seated. Note that the seat may include a main seat on which a driver is seated and a pillion seat on which a fellow passenger is seated. In this case, the seat may be an integrated type seat where the seats are integrally connected or a separate type seat where the seats are separately fabricated.

For example, as described in the paragraph [0018] in Japanese Laid-Open Patent Publication No. 2002-284064, the seat is attached to a rear frame (also referred to as "seat rail"). Note that in a motorcycle according to Japanese Laid-Open Patent Publication No. 2002-284064, the seat is stretched on an upper end of a bearing member provided to the rear frame. Thus, between the seat and the bearing member, a storage space that can store articles is formed. The storage space opens on front, rear, left, and right sides of a vehicle body; thus, the inside of the storage space can be seen from various directions.

SUMMARY OF THE INVENTION

In the motorcycle disclosed in Japanese Laid-Open Patent Publication No. 2002-284064, the inside of the storage space can be seen. In consideration of this, as shown in the paragraph [0035] and FIG. 13, a decorative cover is provided to a side surface below the seat. However, the space below the seat can still be seen from a gap between the seat and the seat rail. Then, the cover or a cowl may be enlarged to cover (hide) the gap between the seat and the seat rail. However, parts become large and have a complicated shape.

A main object of the present invention is to provide a saddle type vehicle where a space below a seat can be hardly seen from a gap between the seat and a seat rail, even in the case of a motorcycle in which a cowl is not provided below the seat.

Another object of the present invention is to provide the saddle type vehicle that has an excellent appearance.

In an embodiment of the present invention, a saddle type vehicle includes a seat rail to which a seat on which a user is seated is attached, wherein: the seat rail includes an outer edge that is placed on an outward side in a vehicle body width direction and an inner edge that is placed on an inward side in the vehicle body width direction and higher than the outer edge, and the outer edge and the inner edge each include a stepped structure where a step part is formed by consecutive vertical surface and inclined surface; the seat includes a seat part on which the user is seated, a side part that is continuous with the seat part and extends toward a lower part of a vehicle body, and a sitting part that is provided to a reverse surface of the seat part, and a lowermost part of the side part is placed lower than a lowermost part of the sitting part; and the sitting part that sits on an upper surface of the inner edge is surrounded by the side part.

By this structure, when the saddle type vehicle is viewed from the side, the view of the sitting part that sits on the upper surface of the inner edge of the seat rail is blocked by the seat. This configuration prevents the user from seeing the inside of the seat rail and the sitting part (particularly, structure, electric component, and the like) from a gap between the seat and the seat rail. Thus, the saddle type vehicle employing this configuration has an excellent appearance.

Therefore, it is not particularly necessary to attach a cowl or the like. In this case, since the cowl below the seat is needless, the saddle type vehicle can be inexpensively provided.

The seat rail can be structured so as to include a left seat rail member, a right seat rail member, and a front cross-link member, a middle cross-link member, and a rear cross-link member that are cross-linked between the left seat rail member and the right seat rail member and extend in the vehicle body width direction. In this case, due to what is called a divided structure, molding is more easily than a single member, and this is an advantage.

Note that in the seat rail, the left seat rail member and the right seat rail member are coupled to a main frame so that a rear frame is structured.

The seat can be structured so as to include a pillion seat including a bottom plate and a skin that covers the bottom plate. In this case, it is preferable that the sitting part is provided inside an external edge of the bottom plate, a lower end of the bottom plate is placed lower than the sitting part, and the skin is fixed inside an end part of the bottom plate. This is because, in this case, it is easy to hide the sitting part by a side part of the pillion seat so that a skin catching part is not seen from the outside.

In this case, the pillion seat may be structured so as to include a fixing part that is provided to a front part of the bottom plate and an engaged part that is provided to a rear part of the bottom plate, the fixing part may be fixed to the middle cross-link member, and the engaged part may be inserted into a slit of the rear cross-link member to be locked by an operation of a lock mechanism. Thus, the pillion seat is supported by the middle cross-link member and the rear cross-link member. In addition, the pillion seat is attached to the seat rail inside the pillion seat. Thus, the engaged part, the lock mechanism, and the like cannot be seen from the outside. As a result, the excellent appearance of the saddle type vehicle is enhanced.

It is preferable that an upper rear fender that is attached to a lower part of the seat rail includes a side wall part where left or right end part rises toward the seat. A space may be formed between the side wall part and an inward side in the vehicle body width direction of the seat rail. For example, when a cable or the like is inserted into this space, the cable can be wired along a front-rear direction of the vehicle body while the cable does not interfere with the structure, the electric component, or the like. Thus, the cable can be easily guided.

In the present invention, the lowermost part of the side part of the seat is placed lower than the lowermost part of the sitting part that is provided to the seat and sits on the seat rail. Thus, when the saddle type vehicle is viewed from the side, the view of the sitting part that sits on the upper surface of the inner edge of the seat rail is blocked by the seat. This configuration prevents the user from seeing the inside of the seat rail and the sitting part (particularly, structures, electric component, and the like) between the seat and the seat rail. Therefore, the saddle type vehicle has the excellent appearance.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a saddle type vehicle according to the present invention is hereinafter described in detail with reference to the attached drawings. Note that in a motorcycle that is described below, a cowl is not provided below a seat. In the description below, "front", "rear", "left", "right", "up", and "down" correspond to a front side, a rear side, a left side, a right side, an upper side, and a lower side of a driver who is seated on a driver's seat of the motorcycle, respectively.

Figure 1:
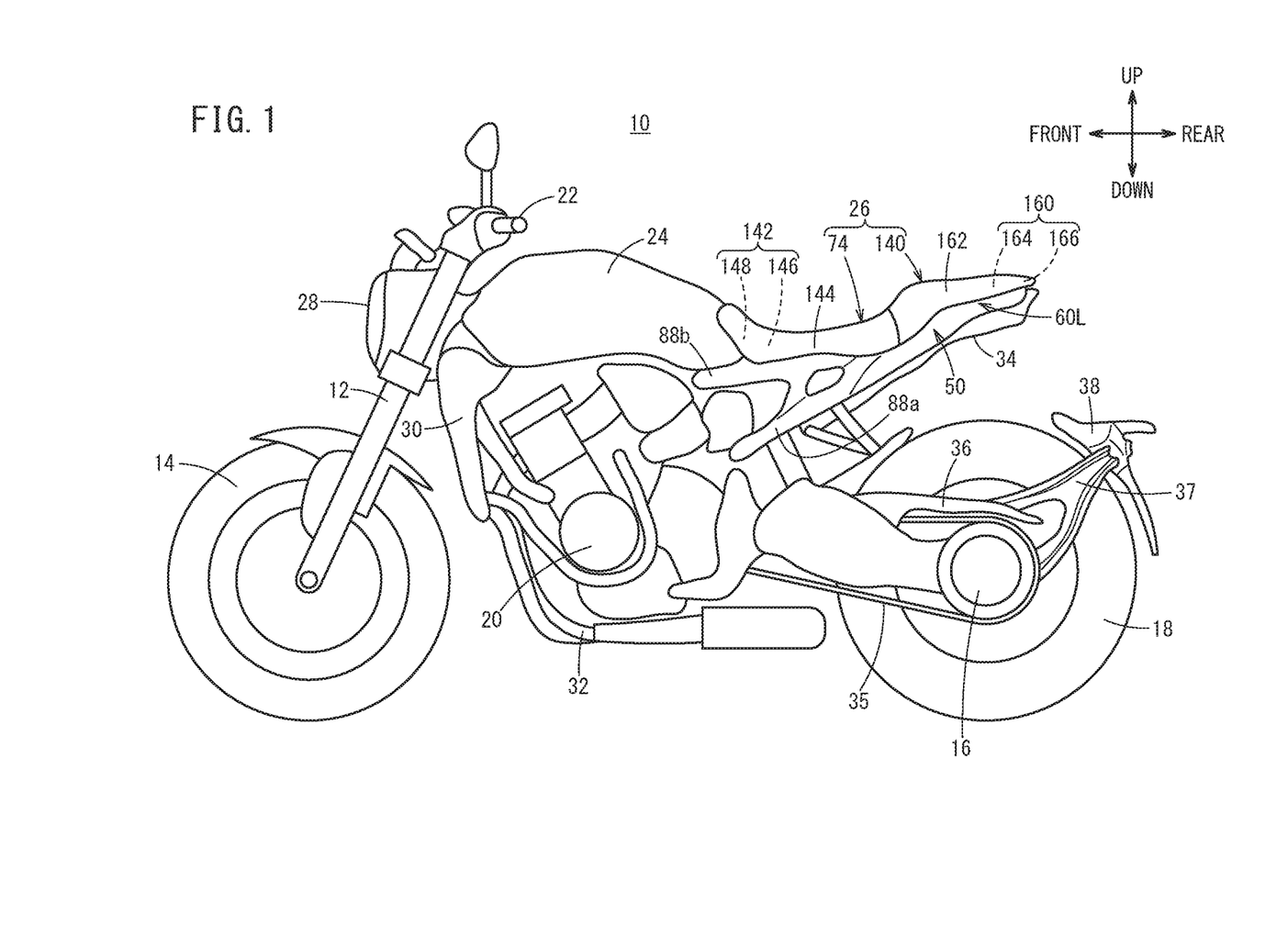
FIG. 1 is a left side view that schematically illustrates a motorcycle as a saddle type vehicle according to an embodiment of the present embodiment.

FIG. 1 is a left side view that schematically illustrates a motorcycle (saddle type vehicle) 10 according to the present embodiment. The motorcycle 10 includes a front wheel 14 supported by a front fork 12, a rear wheel 18 supported by a swing arm 16, an internal combustion engine 20 that generates a driving power that is transmitted to the rear wheel 18, a handlebar 22 provided to an upper end of the front fork 12, a fuel tank 24 that stores fuel for driving the internal combustion engine 20, and a seat 26 on which a user (driver or fellow passenger) is seated. Note that reference signs 28, 30, 32, 34, 35, 36, 37, 38 denote a head light, a shroud, an exhaust pipe, an upper rear fender, a chain, a chain cover, a stay, and a lower rear fender, respectively.

Figure 2:
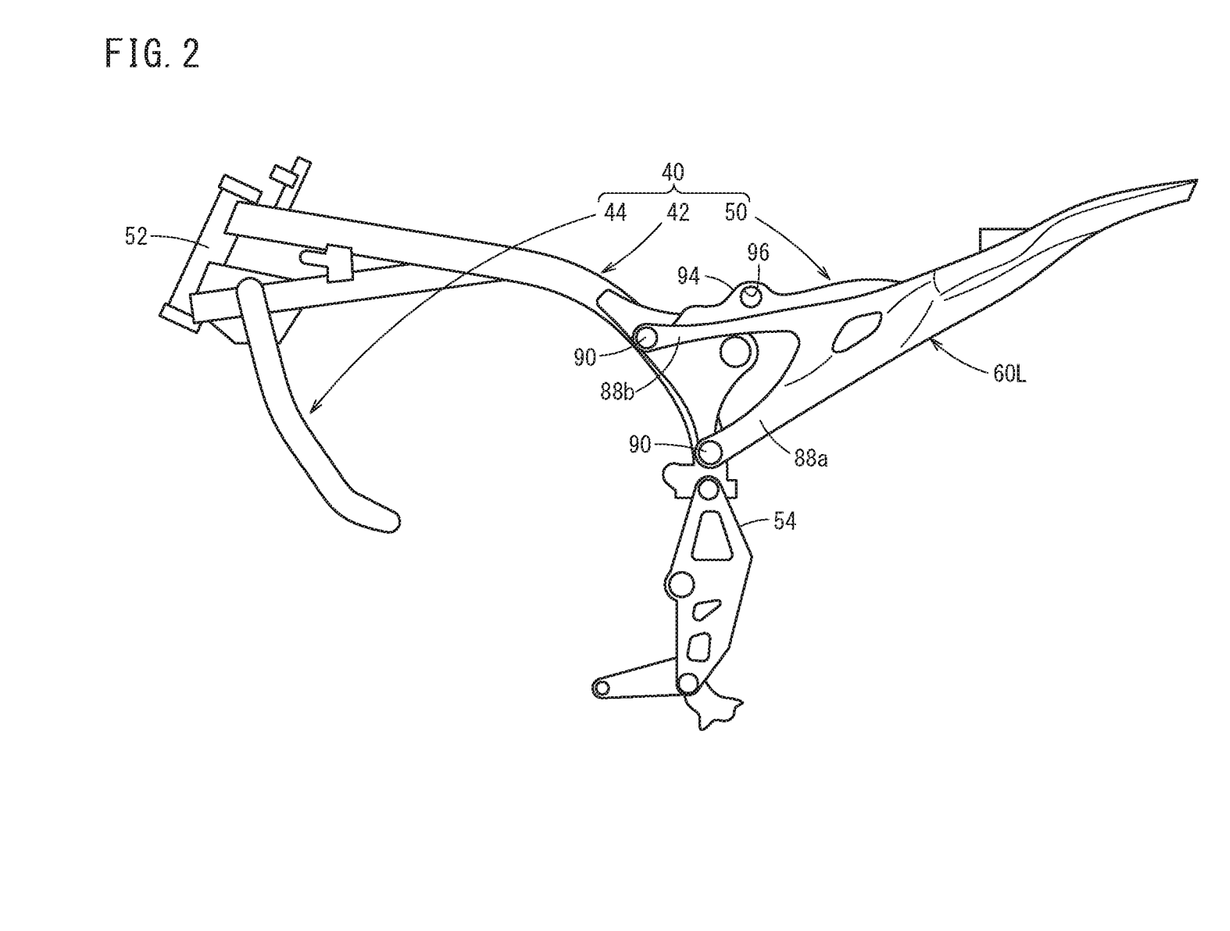
FIG. 2 is a side view that schematically illustrates a vehicle body frame of the motorcycle in FIG. 1.

FIG. 2 is a side view that schematically illustrates a vehicle body frame 40 of the motorcycle 10. The vehicle body frame 40 includes a main frame 42, a sub frame 44, and a seat rail 50. A head pipe 52 is provided to a front side of the main frame 42. A rear end of the main frame 42 curves toward a lower part of a vehicle body. A curved end is connected to a pivot bracket 54 and a curved part is connected to the seat rail 50. Note that the internal combustion engine 20 is housed in a space between the sub frame 44 and the rear end of the main frame 42 that is curved.

Figure 3:
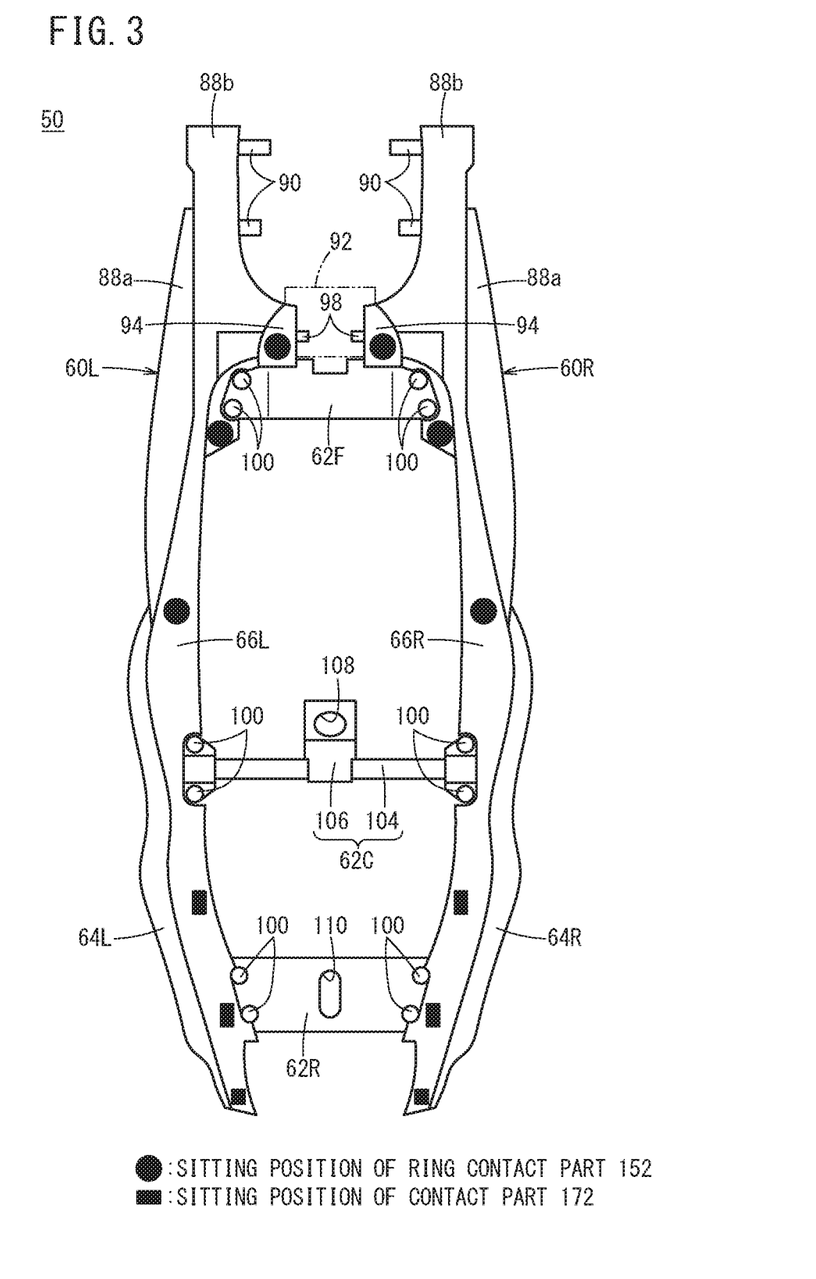
FIG. 3 is a plan view that schematically illustrates an entire seat rail of the vehicle body frame in FIG. 2.

The seat rail 50 will be described in detail. FIG. 3 is a plan view that schematically illustrates the entire seat rail 50. As illustrated in FIG. 3, the seat rail 50 includes a left seat rail member 60L that extends in a front-rear direction on the left side and a right seat rail member 60R that extends in the front-rear direction on the right side. The left seat rail member 60L and the right seat rail member 60R are connected by three cross members 62F, 62C, 62R (cross-link members) so that the left seat rail member 60L and the right seat rail member 60R are away from each other with a predetermined distance. The left seat rail member 60L and the right seat rail member 60R are arranged in a mirror symmetry relation.

The seat rail 50 includes a lower opening that opens downward and an upper opening that opens upward. The lower opening is closed by the upper rear fender 34 (see FIG. 1 and FIG. 4). On the other hand, the upper opening is closed by the seat 26 (see FIG. 1).

Figure 4:
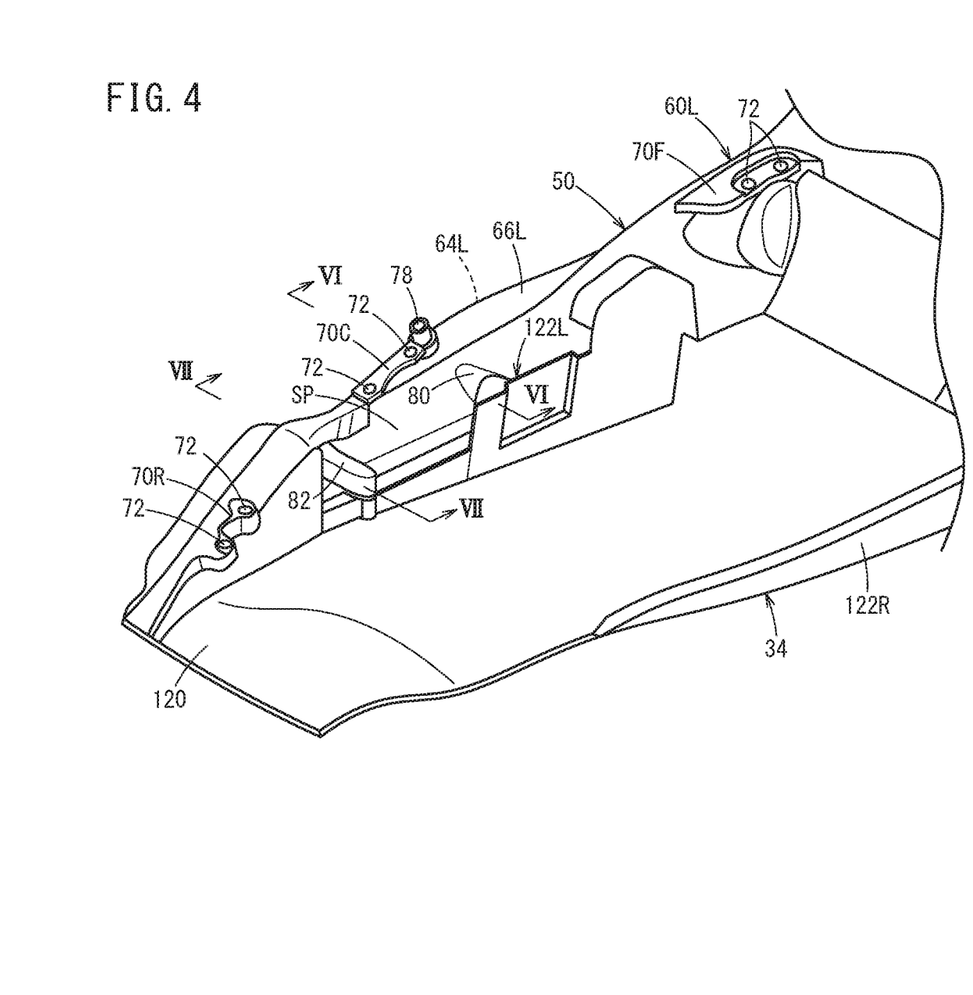
FIG. 4 is a perspective view that schematically illustrates a left seat rail member of the seat rail and an upper rear fender that closes a lower opening of the seat rail.
Figure 5:
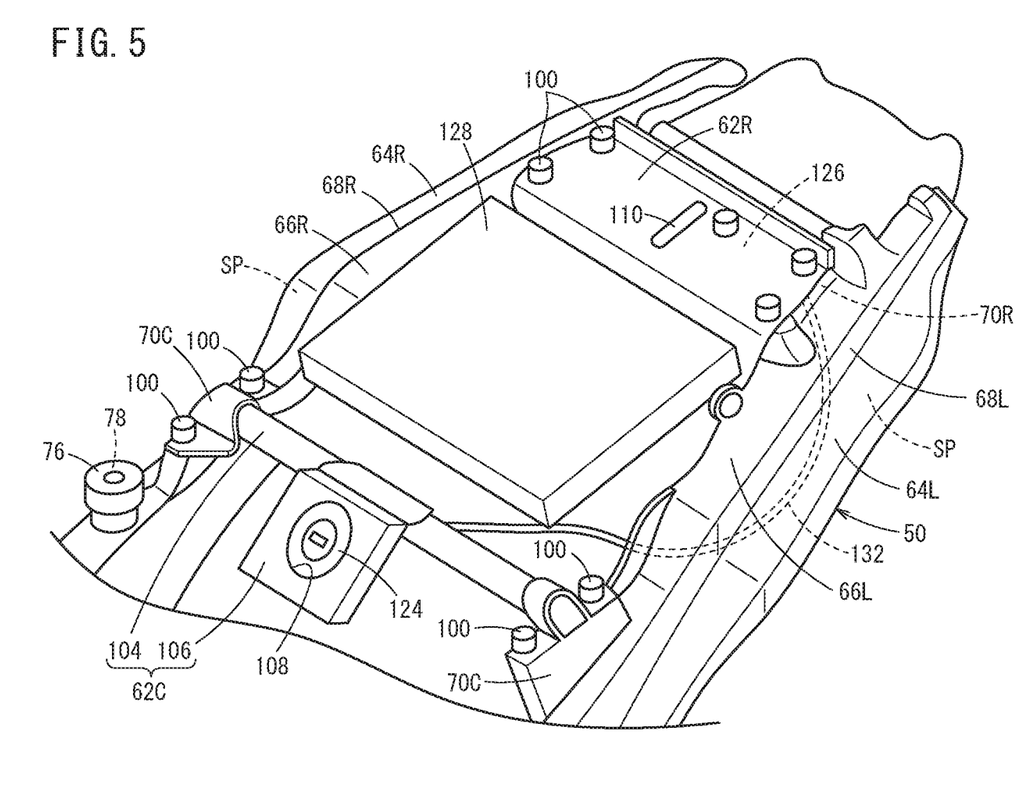
FIG. 5 is a perspective view that schematically illustrates a state in which a structure, an electric component, and the like are mounted on the upper rear fender that is attached to the seat rail.

As illustrated in FIG. 4 and FIG. 5, the left seat rail member 60L and the right seat rail member 60R include outer edges 64L, 64R that are placed outside, and inner edges 66L, 66R that are placed inside, respectively. The inner edges 66L, 66R are placed higher than the outer edges 64L, 64R. Therefore, on the rear side, a stepped structure is formed where step parts 68L, 68R are formed by the outer edges 64L, 64R and the inner edges 66L, 66R, respectively. That is to say, the inner edges 66L, 66R are formed as rib parts that project from the outer edges 64L, 64R to the inside through the step parts 68L, 68R. On the other hand, the outer edges 64L, 64R are formed as hollow parts that include side walls expanding farther than the inner edges 66L, 66R. That is, each of the left seat rail member 60L and the right seat rail member 60R includes the stepped structure where the step part is formed by consecutive vertical surface and inclined surface, and is a hollow body where the inside in a vehicle body width direction has an opening.

A front stay part 70F, a center stay part 70C, and a rear stay part 70R are formed on the inner edges 66L, 66R. For-stay bolt holes 72 are provided to each of these stay parts 70F, 70C, 70R. Near the front side of the center stay part 70C, a for-seat bolt hole 78 that receives a for-seat bolt 76 that connects to the seat 26 (main seat 74) is formed.

From an inner surface of each of the outer edges 64L, 64R, a for-engagement boss part 80 and a receiving-bolt boss part 82 project toward the inside. The for-engagement boss part 80 and the receiving-bolt boss part 82 are disposed so as to have the center stay part 70C therebetween. Specifically, the for-engagement boss part 80 is disposed on the front side and the receiving-bolt boss part 82 is disposed on the rear side. As described below, both the boss parts 80, 82 are used to hold the upper rear fender 34 on the seat rail 50. The receiving-bolt boss part 82 is provided with a bolt fastening hole 84 (see FIG. 7) in a manner that the bolt fastening hole 84 penetrates through the boss part 82.

The front side of each of the inner edges 66L, 66R extends along a bottom plate side of the fuel tank 24, and the front side of each of the outer edges 64L, 64R extends toward the pivot bracket 54 side. Thus, the left seat rail member 60L and the right seat rail member 60R each have a lateral Y-like shape where the front end is branched into two when viewed from the side (see FIG. 2). The front ends of the inner edges 66L, 66R and the outer edges 64L, 64R are provided with connection arm parts 88a, 88b that include bolt insertion holes (not shown). A seat-rail bolt 90 (see FIG. 3) that is used for connecting the seat rail 50 to the main frame 42 is inserted into the bolt insertion hole.

Near the connection arm part 88b, a tank stay holding part 94 for holding a tank stay 92 is provided. The tank stay holding part 94 includes a holding hole 96, and a holding bolt 98 is inserted into the holding hole 96. This holding bolt 98 is screwed to a side part of the tank stay 92 so that the tank stay 92 is held by the seat rail 50.

The seat rail 50 includes, in addition to the left seat rail member 60L and the right seat rail member 60R, the three cross members described above, that is, the front cross member 62F (front cross-link member), the center cross member 62C (middle cross-link member), and the rear cross member 62R (rear cross-link member) in this order from the front side. These front cross member 62F, center cross member 62C, and rear cross member 62R each include bolt insertion holes (not shown) that overlap the for-stay bolt holes 72 of the front stay part 70F, the center stay part 70C, and the rear stay part 70R, respectively. A cross member attachment bolt 100 that is inserted into the bolt insertion hole is screwed to the for-stay bolt hole 72. Thus, the front cross member 62F, the center cross member 62C, and the rear cross member 62R are cross-linked between the left seat rail member 60L and the right seat rail member 60R.

By the cross-link, the seat rail 50 is formed. The seat rail 50 includes the three cross members 62F, 62C, 62R between the left seat rail member 60L and the right seat rail member 60R, and an extending direction of the cross members 62F, 62C, 62R is approximately orthogonal to the extending direction of the left seat rail member 60L and the right seat rail member 60R. In this case, the left seat rail member 60L and the right seat rail member 60R are separated from each other with the three cross members 62F, 62C, 62R interposed therebetween, and are not in contact with each other in any part. Note that the tank stay 92 is placed near the front cross member 62F, and positions and fixes the fuel tank 24.

The center cross member 62C has a structure in which a frame body part 106 is provided at an approximate center of a main body part 104 in a longitudinal direction. The main body part 104 has a bar-like shape. A window part 108 is formed so as to penetrate through the frame body part 106. A key cylinder 124 is attached to the frame body part 106, and a key insertion port of the key cylinder 124 appears in the window part 108. A striker groove 110 (slit) that extends along the front-rear direction penetrates through an approximate center of the rear cross member 62R in the longitudinal direction, the rear cross member 62R having approximately a thin plate shape.

As illustrated in FIG. 4, the upper rear fender 34 that closes the lower opening of the seat rail 50 includes a fender bottom plate 120, a left side plate 122L, and a right side plate 122R. The left side plate 122L and the right side plate 122R are a side wall part (in FIG. 4, most of right seat rail member 60R has been omitted for convenience). The fender bottom plate 120 extends along the front-rear direction and covers the lower opening of the seat rail 50. On an upper surface of the fender bottom plate 120, a structure such as a lock mechanism 126, an electric component such as an instrument 128 for an electronic toll collection system (ETC), and the like illustrated in FIG. 5 are positioned by a stopper wall that is not shown. The lock mechanism 126 includes a lock hook (not shown) that is inserted into a lock ring 170 (see FIG. 8 and FIG. 10) to be described below.

On the other hand, the left side plate 122L and the right side plate 122R rise approximately vertically from a left end part and a right end part of the fender bottom plate 120, and face the outer edges 64L, 64R of the left seat rail member 60L and the right seat rail member 60R with a predetermined distance. Therefore, a space SP is formed between the left side plate 122L and the outer edge 64L, and another space SP is formed between the right side plate 122R and the outer edge 64R. A cable 132 provided between the key cylinder 124 and the lock mechanism 126 is inserted into the space SP.

Figure 6:
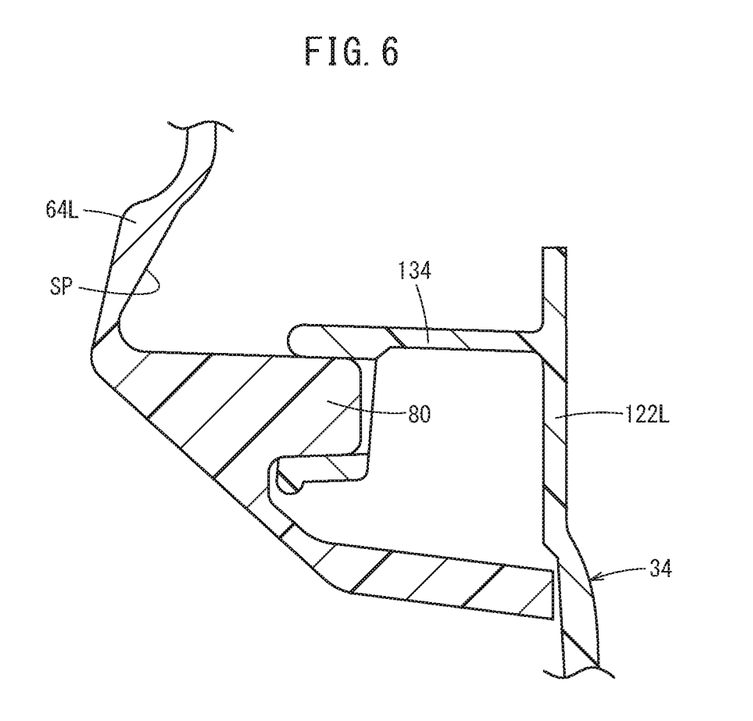
FIG. 6 is a cross-sectional view taken along a VI-VI arrow line in FIG. 4.

Each of the left side plate 122L and the right side plate 122R is provided with a boss receiving part 134 (see FIG. 6) that is hollow and a bolt receiving part 136 (see FIG. 7) near a site that corresponds to the center stay part 70C of each of the left seat rail member 60L and the right seat rail member 60R. The boss receiving part 134 and the bolt receiving part 136 are arranged sandwiching the site and project outwards in the width direction. FIG. 6 is a cross-sectional view taken along a VI-VI arrow line in FIG. 4. As illustrated in FIG. 6, a tip end of the for-engagement boss part 80 enters a tip end of the boss receiving part 134 having a small diameter. Note that FIG. 6 illustrates the left seat rail member 60L as an example. However, the right seat rail member 60R can be illustrated in the same manner.

Figure 7:
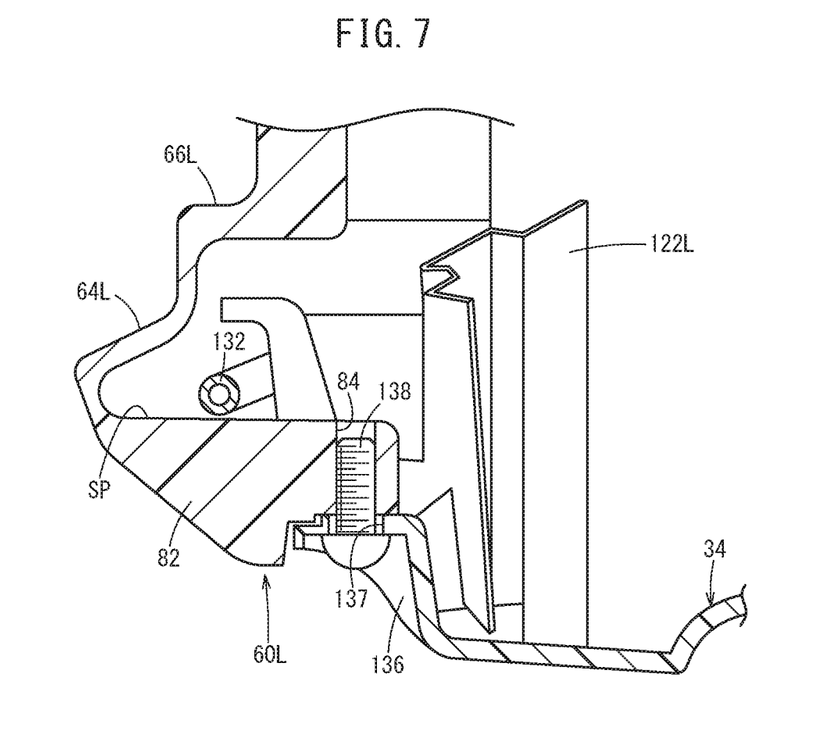
FIG. 7 is a cross-sectional view taken along a VII-VII arrow line in FIG. 4.

FIG. 7 is a cross-sectional view taken along a VII-VII arrow line in FIG. 4. As illustrated in FIG. 7, the bolt receiving part 136 overlaps a lower part of the receiving-bolt boss part 82. A bolt receiving hole 137 provided to the bolt receiving part 136 is continuous with the bolt fastening hole 84 provided to the receiving-bolt boss part 82. A fender attachment bolt 138 that is inserted into the bolt receiving hole 137 is screwed to the bolt fastening hole 84. Thus, the upper rear fender 34 is held by the seat rail 50. Accordingly, the lower opening of the seat rail 50 is closed by the upper rear fender 34. Note that FIG. 7 also illustrates an example of the left seat rail member 60L. However, needless to say, the right seat rail member 60R can be illustrated in the same manner.

Figure 8:
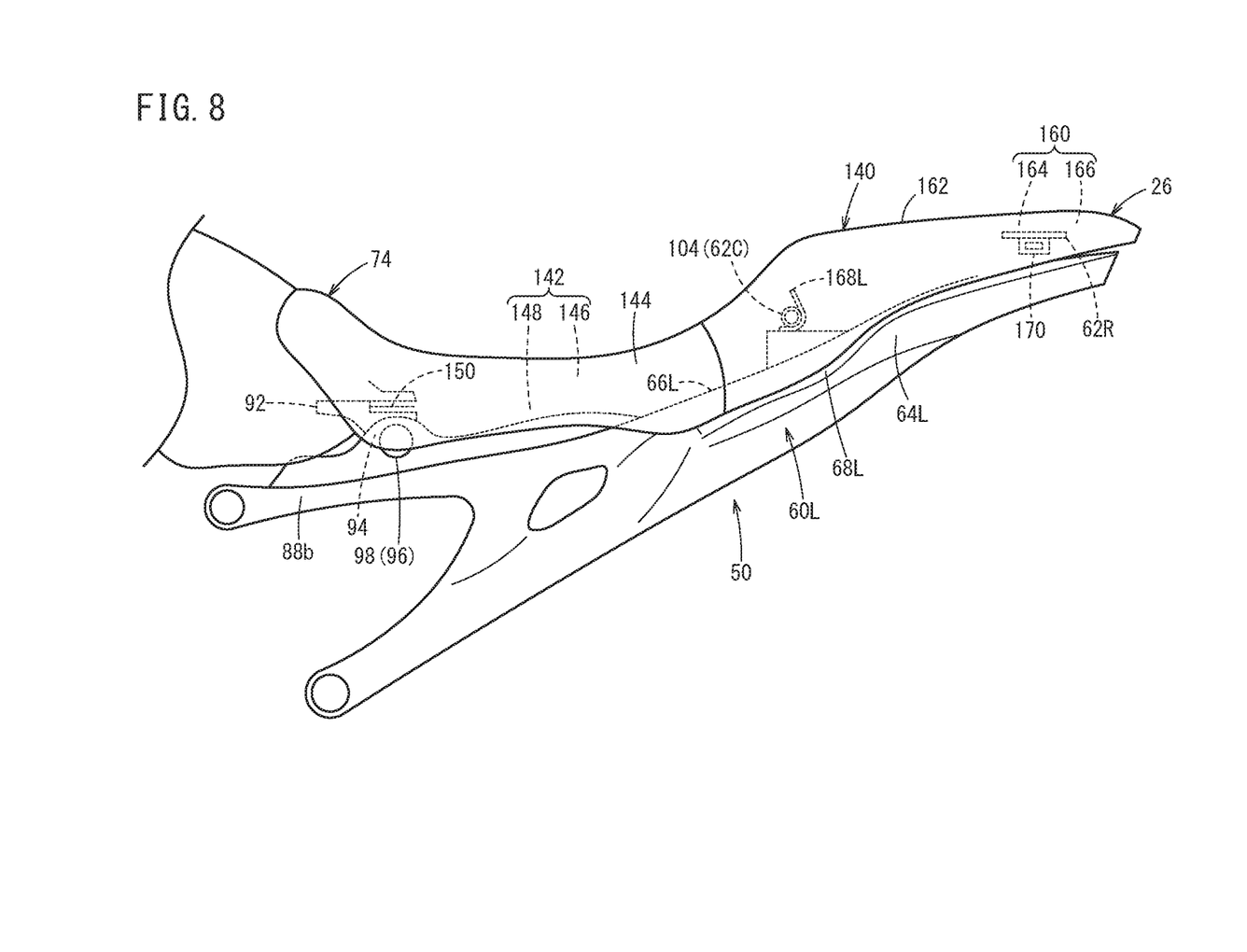
FIG. 8 is a side view that illustrates a magnified principal part near the seat of the motorcycle.

Next, the seat 26 will be described. In the present embodiment, the seat 26 includes the main seat 74 and a pillion seat 140 as illustrated in FIG. 1 and FIG. 8.

Figure 9:
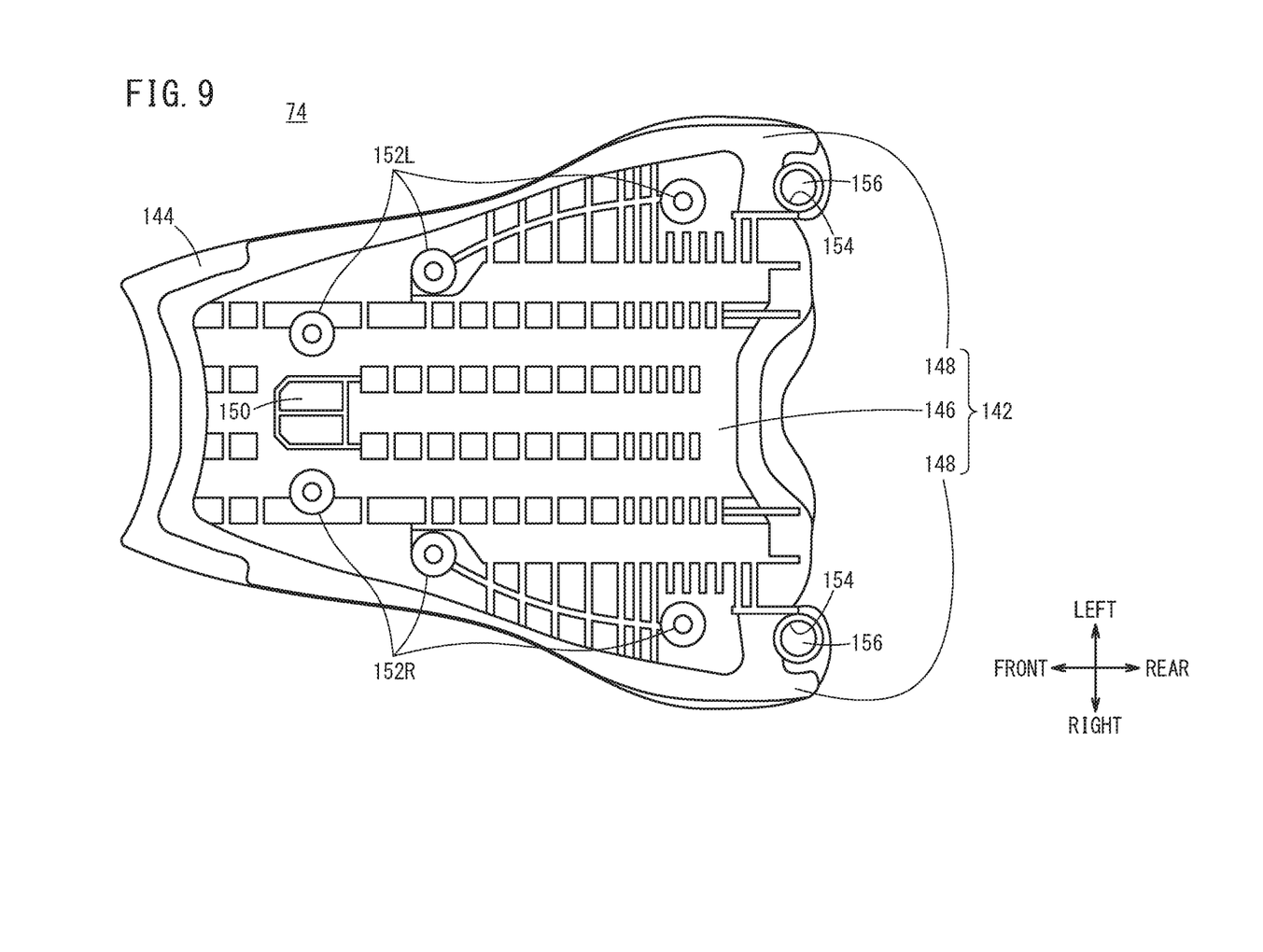
FIG. 9 is a bottom view of a main seat.

As illustrated in FIG. 9, the main seat 74 includes an MS bottom plate 142 and an MS skin 144 that covers the MS bottom plate 142. The MS bottom plate 142 includes an MS seat part 146 on which a driver is seated, and an MS side part 148 that projects outwards in the width direction from the MS seat part 146 and spreads like an umbrella. The MS skin 144 is folded to the inner surface side of the MS side part 148 at an end part of the MS side part 148, and is fixed inside an end part of the MS bottom plate 142 through a staple that is not shown.

The front side of the main seat 74 inclines upward along the curve of the rear side of the fuel tank 24 (see FIG. 1). An engagement part 150 is provided to a portion of the MS bottom plate 142 where the inclination starts, so that the engagement part 150 projects from the MS bottom plate 142 and extends forward. This engagement part 150 is a U-shaped groove that opens forward. When the engagement part 150 is inserted into a ceiling plate of the tank stay 92, the main seat 74 is fixed to the tank stay 92.

The MS bottom plate 142 is provided with three left ring contact parts 152L and three right ring contact parts 152R. The left ring contact part 152L and the right ring contact part 152R are spaced a predetermined distance apart. Both the left ring contact part 152L and the right ring contact part 152R are sitting parts that sit on the upper surface of the inner edges 66L, 66R of the seat rail 50. In addition, on the rear side of the MS bottom plate 142, a ring part 156 including a for-seat bolt insertion hole 154 that overlaps the for-seat bolt hole 78 is provided.

Figure 10:
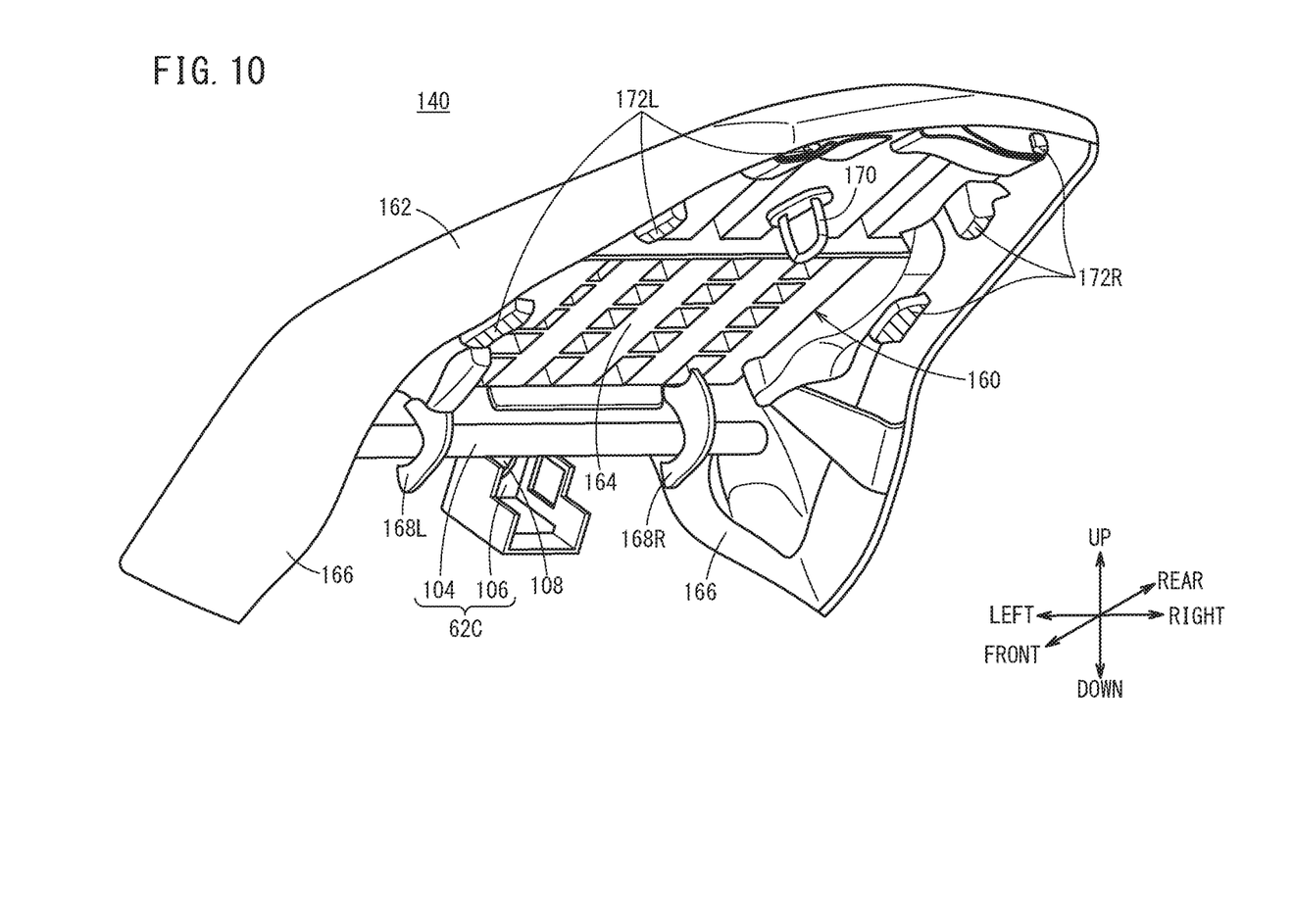
FIG. 10 is a perspective view of a pillion seat when viewed from below.

On the other hand, as illustrated in FIG. 10, the pillion seat 140 includes a PS bottom plate 160 and a PS skin 162 that covers the PS bottom plate 160. The PS bottom plate 160 includes a PS seat part 164 on which a fellow passenger is seated, and a PS side part 166 that projects outwards in the width direction from the PS seat part 164 and spreads like an umbrella. The PS skin 162 is folded to the inner surface side of the PS side part 166 at an end part of the PS side part 166, and is fixed inside an end part of the PS bottom plate 160 through a staple that is not shown.

On the PS bottom plate 160, a left catching hook 168L and a right catching hook 168R (fixing parts) that engage with the center cross member 62C are provided on the front side, and the lock ring 170 (engaged part) with an approximately reverse Ω-like shape that is inserted into the striker groove 110 of the rear cross member 62R is provided on the rear side. The PS bottom plate 160 is provided with three left contact parts 172L and three right contact parts 172R. The left contact part 172L and the right contact part 172R are spaced a predetermined distance apart. These left contact parts 172L and right contact parts 172R are sitting parts that sit on the inner edges 66L, 66R of the seat rail 50. In FIG. 10, top surfaces that sit on the inner edges 66L, 66R have been hatched.

To be described below, when the seat 26 is attached to the seat rail 50, the lowermost part of the MS side part 148 and the PS side part 166 is placed a little higher than the outer edges 64L, 64R and lower than the upper surface of the inner edges 66L, 66R of the seat rail 50 (see FIG. 8). Therefore, the left ring contact part 152L and the right ring contact part 152R corresponding to the sitting parts of the main seat 74 and the left contact part 172L and the right contact part 172R of the pillion seat 140 are covered by the MS side part 148 and the PS side part 166.

The motorcycle 10 according to the present embodiment is basically structured as above. Next, description is made of its operation effect.

The seat rail 50 is formed by connecting the left seat rail member 60L and the right seat rail member 60R through the front cross member 62F, the center cross member 62C, and the rear cross member 62R. That is to say, the bolt insertion holes of the front cross member 62F, the center cross member 62C, and the rear cross member 62R are overlapped on the for-stay bolt holes 72 of the front stay part 70F, the center stay part 70C, and the rear stay part 70R, respectively. Then, the cross member attachment bolt 100 that is inserted into the bolt insertion hole is screwed to the for-stay bolt hole 72. Thus, the seat rail 50 illustrated in FIG. 2 is fabricated. In this manner, since the seat rail 50 has a divided structure, the seat rail 50 can be fabricated more easily than in a case in which the seat rail 50 is made up from a single member.

The holding bolt 98 is inserted into the holding hole 96 of the tank stay holding part 94 and the holding bolt 98 is screwed to the side part of the tank stay 92. Thus, the tank stay 92 is held near the front cross member 62F of the seat rail 50.

To the seat rail 50 obtained as above, the upper rear fender 34 is attached. That is to say, to the boss receiving part 134 of the upper rear fender 34, the tip end of each for-engagement boss part 80 of the left seat rail member 60L or the right seat rail member 60R is engaged. The fender attachment bolt 138 is inserted into the bolt receiving hole 137 of the bolt receiving part 136 that overlaps the lower part of each receiving-bolt boss part 82 of the left seat rail member 60L and the right seat rail member 60R of the upper rear fender 34. This fender attachment bolt 138 is screwed to the bolt fastening hole 84 of the receiving-bolt boss part 82.

In this case, the fender bottom plate 120 of the upper rear fender 34 covers the lower opening of the seat rail 50, and the left side plate 122L and the right side plate 122R face the inner side part of the left seat rail member 60L and the right seat rail member 60R, respectively. Since the left side plate 122L and the right side plate 122R, and the inner side part of the left seat rail member 60L and the right seat rail member 60R are attached so as to be away from each other with a predetermined distance, the space SP is formed between the left side plate 122L and the inner side part of the left seat rail member 60L, and another space SP is formed between the right side plate 122R and the inner side part of the right seat rail member 60R.

The seat rail 50 is connected to the main frame 42 through the seat-rail bolts 90 that are inserted into the bolt insertion holes of the connection arm parts 88a, 88b of the left seat rail member 60L and the right seat rail member 60R. After that, the fuel tank 24, the internal combustion engine 20, and the like are mounted on the main frame 42. On the fender bottom plate 120 of the upper rear fender 34, a structure such as the lock mechanism 126, an electric component such as the instrument 128 for the electronic toll collection system (ETC), and the like are positioned and fixed.

The position of the key insertion port of the key cylinder 124 corresponds to the window part 108 of the center cross member 62C. To this key insertion port, a key is inserted. This key unlocks the lock by the lock mechanism 126 (lock hook) of the lock ring 170 that is inserted into the striker groove 110 of the rear cross member 62R. Thus, the cable 132 of the key cylinder 124 is extended to the lock mechanism 126. Here, the cable 132 is inserted into the space SP that is formed between the left, right side plates 122L, 122R and the outer edges 64L, 64R. Therefore, the cable 132 does not interfere with the lock mechanism 126, the electric component, or the like. In other words, the cable 132 can be easily guided.

Next, the main seat 74 is attached to the seat rail 50. That is to say, the U-shaped groove of the engagement part 150 provided to the MS bottom plate 142 is inserted into the ceiling plate of the tank stay 92. On the other hand, the left ring contact part 152L and the right ring contact part 152R sit on the upper surface of the inner edges 66L, 66R of the seat rail 50. At this time point, the for-seat bolt hole 78 of the seat rail 50 and the for-seat bolt insertion hole 154 of the ring part 156 provided to the main seat 74 overlap. The for-seat bolt 76 that is inserted into the for-seat bolt insertion hole 154 is screwed to the for-seat bolt hole 78.

In addition, the pillion seat 140 is attached to the seat rail 50. That is to say, the left catching hook 168L and the right catching hook 168R are fixed to the main body part 104 of the center cross member 62C, and the lock ring 170 is inserted into the striker groove 110 of the rear cross member 62R. In addition, the lock hook of the lock mechanism 126 is inserted into the lock ring 170. Thus, the pillion seat 140 is supported by the center cross member 62C and the rear cross member 62R and is locked.

Note that the frame body part 106 and the key insertion port are exposed between the main seat 74 and the pillion seat 140. In order to unlock the locked state, the key is inserted into the key insertion port and turned to a predetermined direction.

When the pillion seat 140 is locked as described above, the left contact part 172L and the right contact part 172R sit on the upper surface of the inner edges 66L, 66R of the seat rail 50. That is to say, in the present embodiment, all of the left ring contact part 152L and the right ring contact part 152R of the main seat 74, and the left contact part 172L and the right contact part 172R of the pillion seat 140 are placed on the upper surface of the inner edges 66L, 66R. In FIG. 3, black circles indicate sitting positions of the left ring contact part 152L and the right ring contact part 152R, and black squares indicate sitting positions of the left contact part 172L and the right contact part 172R.

Here, the main seat 74 and the pillion seat 140 include the MS side part 148 and the PS side part 166, respectively. Since the lowermost part of the MS side part 148 and the PS side part 166 is placed lower than the left ring contact part 152L, the right ring contact part 152R, the left contact part 172L, and the right contact part 172R as illustrated in FIG. 8, the inner edges 66L, 66R are surrounded by the MS side part 148 and the PS side part 166. Moreover, the left ring contact part 152L, the right ring contact part 152R, the left contact part 172L, and the right contact part 172R are disposed inside an external edge of the main seat 74 and the pillion seat 140. In addition, the MS skin 144 and the PS skin 162 are fixed to the inside of the end part of the MS bottom plate 142 and the PS bottom plate 160, respectively.

Thus, when the user views the motorcycle 10 from the side, the stepped structure prevents the user from seeing the inside of the seat rail 50 and the upper surface of the inner edges 66L, 66R that are away from the outer edges 64L, 64R. This is because the view of the inside of the seat rail 50 and the upper surface of the inner edges 66L, 66R is blocked by the MS side part 148 and the PS side part 166.

That is to say, in this case, even if the cowl is not provided below the seat 26 of the motorcycle 10, it is possible to prevent the user from seeing the left ring contact part 152L, the right ring contact part 152R, the left contact part 172L, and the right contact part 172R, the structure and the electric component that are supported by the upper rear fender 34, or the like from the gap between the seat 26 and the seat rail 50 when the motorcycle 10 is viewed from the side. Therefore, the motorcycle 10 that is inexpensive and has an excellent appearance can be provided.

The present invention is not particularly limited to the embodiment described as above, and can be variously modified in the range without departing from the concept of the present invention.

For example, the motorcycle 10 may include the cowl. In addition, the saddle type vehicle is not limited to the motorcycle 10, and may be a tricycle or a four-wheeled buggy used in a buggy race or the like.

What is claimed is:

1. A saddle type vehicle including a seat rail to which a seat on which a user is seated is attached, wherein:
   the seat rail includes an outer edge that is placed on an outward side in a vehicle body width direction and an inner edge that is placed on an inward side in the vehicle body width direction and higher than the outer edge, and the outer edge and the inner edge each include a stepped structure where a step part is formed by consecutive vertical surfaces and inclined surfaces;
   the seat includes a seat part on which the user is seated, a side part that is continuous with the seat part and extends toward a lower part of a vehicle body, and a sitting part that is provided to a reverse surface of the seat part, and a lowermost part of the side part is placed lower than a lowermost part of the sitting part; and
   the sitting part that sits on an upper surface of the inner edge is surrounded by the side part.

2. The saddle type vehicle according to claim 1, wherein the seat rail includes a left seat rail member, a right seat rail member, and a front cross-link member, a middle cross-link member, and a rear cross-link member that are cross-linked between the left seat rail member and the right seat rail member and extend in the vehicle body width direction.

3. The saddle type vehicle according to claim 1, wherein the seat includes a pillion seat including a bottom plate and a skin that covers the bottom plate, and is provided with the sitting part inside an external edge of the bottom plate, and the skin is fixed at an end part of the bottom plate.

4. The saddle type vehicle according to claim 3, wherein:
   the pillion seat includes a catching part that is provided to a front part of the bottom plate and an engaged part that is provided to a rear part of the bottom plate; and
   when the catching part catches the middle cross-link member and the engaged part is inserted into a slit of the rear cross-link member to be locked by an operation of a lock mechanism, the pillion seat is supported by the middle cross-link member and the rear cross-link member.

5. The saddle type vehicle according to claim 1, wherein an upper rear fender that is attached to a lower part of the seat rail includes a side wall part that rises toward the seat, and a space is formed between the side wall part and an inward side in the vehicle body width direction of the seat rail.

6. A saddle type vehicle including a seat rail to which a seat on which a user is seated is attached, wherein:
   the seat rail includes an outer edge that is placed on an outward side in a vehicle body width direction and an inner edge that is placed on an inward side in the vehicle body width direction and higher than the outer edge, and the outer edge and the inner edge each include a stepped structure where a step part is formed by consecutive vertical surfaces and inclined surfaces;
   the seat includes a seat part on which the user is seated, a side part that is continuous with the seat part and extends toward a lower part of a vehicle body, and a sitting part that is provided to a reverse surface of the seat part, and a lowermost part of the side part is placed lower than a lowermost part of the sitting part;
   the sitting part that sits on an upper surface of the inner edge is surrounded by the side part;
   the seat rail includes a left seat rail member, a right seat rail member, and a front cross-link member, a middle cross-link member, and a rear cross-link member that are cross-linked between the left seat rail member and the right seat rail member and extend in the vehicle body width direction; and
   an upper rear fender that is attached to a lower part of the seat rail includes a side wall part that rises toward the seat, and a space is formed between the side wall part and an inward side in the vehicle body width direction of the seat rail.

7. A saddle type vehicle including a seat rail to which a seat on which a user is seated is attached, wherein:
   the seat rail includes an outer edge that is placed on an outward side in a vehicle body width direction and an inner edge that is placed on an inward side in the vehicle body width direction and higher than the outer edge, and the outer edge and the inner edge each include a stepped structure where a step part is formed by consecutive vertical surfaces and inclined surfaces;

the seat includes a seat part on which the user is seated, a side part that is continuous with the seat part and extends toward a lower part of a vehicle body, and a sitting part that is provided to a reverse surface of the seat part, and a lowermost part of the side part is placed lower than a lowermost part of the sitting part;

the sitting part that sits on an upper surface of the inner edge is surrounded by the side part;

the seat includes a pillion seat including a bottom plate and a skin that covers the bottom plate, and is provided with the sitting part inside an external edge of the bottom plate, and the skin is fixed at an end part of the bottom plate;

the pillion seat includes a catching part that is provided to a front part of the bottom plate and an engaged part that is provided to a rear part of the bottom plate;

when the catching part catches the middle cross-link member and the engaged part is inserted into a slit of the rear cross-link member to be locked by an operation of a lock mechanism, the pillion seat is supported by the middle cross-link member and the rear cross-link member; and an upper rear fender that is attached to a lower part of the seat rail includes a side wall part that rises toward the seat, and a space is formed between the side wall part and an inward side in the vehicle body width direction of the seat rail.

8. A saddle type vehicle including a seat rail to which a seat on which a user is seated is attached, wherein:

the seat rail includes an outer edge that is placed on an outward side in a vehicle body width direction and an inner edge that is placed on an inward side in the vehicle body width direction and higher than the outer edge, and the outer edge and the inner edge each include a stepped structure where a step part is formed by consecutive vertical surfaces and inclined surfaces;

the seat includes a seat part on which the user is seated, a side part that is continuous with the seat part and extends toward a lower part of a vehicle body, and a sitting part that is provided to a reverse surface of the seat part, and a lowermost part of the side part is placed lower than a lowermost part of the sitting part;

the sitting part that sits on an upper surface of the inner edge is surrounded by the side part;

the saddle type vehicle further comprises an upper rear fender that is attached to a lower part of the seat rail;

the upper rear fender includes a side wall part that rises toward the seat, and a space is formed between the side wall part and an inner side part of the seat rail; and a predetermined cable is routed through the space.

* * * * *